(12) United States Patent
Arkadyev

(10) Patent No.: US 9,697,110 B1
(45) Date of Patent: Jul. 4, 2017

(54) CODELESS SYSTEM AND TOOL FOR TESTING APPLICATIONS

(71) Applicant: Bank of America Corporation, Charlotte, NC (US)

(72) Inventor: Alexander Arkadyev, Thornhill (CA)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/980,092

(22) Filed: Dec. 28, 2015

(51) Int. Cl.
  *G06F 11/36* (2006.01)
  *G06F 9/44* (2006.01)

(52) U.S. Cl.
  CPC .............................. *G06F 11/3696* (2013.01)

(58) Field of Classification Search
  None
  See application file for complete search history.

(56) References Cited

U.S. PATENT DOCUMENTS

| | | | |
|---|---|---|---|
| 6,070,152 A | 5/2000 | Carey et al. | |
| 6,564,342 B2 | 5/2003 | Landan | |
| 6,701,325 B2 | 3/2004 | Becker et al. | |
| 6,823,495 B1 | 11/2004 | Vedula et al. | |
| 6,854,089 B1 | 2/2005 | Santee et al. | |
| 7,100,195 B1 | 8/2006 | Underwood | |
| 7,681,180 B2 * | 3/2010 | de Halleux | G06F 11/3688 714/32 |
| 7,930,343 B2 | 4/2011 | Zhang et al. | |
| 7,958,495 B2 | 6/2011 | Kelso | |
| 8,117,218 B2 | 2/2012 | Dam | |
| 8,677,320 B2 | 3/2014 | Wilson et al. | |
| 8,707,263 B2 | 4/2014 | Osenkov et al. | |
| 9,053,237 B2 | 6/2015 | Channamsetti et al. | |
| 9,135,147 B2 | 9/2015 | Artzi et al. | |
| 9,189,377 B1 | 11/2015 | Arkadyev | |
| 9,606,901 B1 * | 3/2017 | Elgarat | G06F 11/3684 |
| 2007/0220341 A1 | 9/2007 | Apostoloiu et al. | |
| 2008/0126346 A1 * | 5/2008 | Zheng | G06Q 50/22 |
| 2010/0241518 A1 | 9/2010 | McCann | |

(Continued)

OTHER PUBLICATIONS

"HP QuickTest Professional," Wikipedia.org, retrieved Dec. 29, 2015 from <https://en.wikipedia.org/wiki/HP_QuickTest_Professional>.

(Continued)

*Primary Examiner* — Daxin Wu
(74) *Attorney, Agent, or Firm* — Banner & Witcoff, Ltd.; Michael A. Springs

(57) ABSTRACT

The application code testing computing device may receive a set of instructions for testing one or more user interface pages of an application under test. The computing device may determine that the set of instructions is written in a first format, and parse the set of instructions to determine an action to perform and to determine data to use for the action to perform in response to determining that the set of instructions is written in the first format. Systems described herein may convert the determined action to perform to a second format to generate a converted action to perform and/or convert the determined data to use for the action to perform to the second format to generate converted data. The application code testing computing device may send, to an application framework, the converted action to perform and the converted data.

20 Claims, 8 Drawing Sheets

(56) References Cited

U.S. PATENT DOCUMENTS

| | | | |
|---|---|---|---|
| 2011/0123973 A1 | 5/2011 | Singh | |
| 2011/0283148 A1 | 11/2011 | Rossi | |
| 2011/0289489 A1 | 11/2011 | Kumar et al. | |
| 2012/0204091 A1 | 8/2012 | Sullivan et al. | |
| 2013/0138495 A1 | 5/2013 | Lemphers et al. | |
| 2013/0219307 A1 | 8/2013 | Raber et al. | |
| 2014/0032637 A1 | 1/2014 | Weir | |
| 2014/0229920 A1 | 8/2014 | Rossi | |
| 2016/0283353 A1* | 9/2016 | Owen | G06F 11/3664 |
| 2016/0321166 A1* | 11/2016 | Totale | G06F 11/3692 |

OTHER PUBLICATIONS

"Cucumber," Cucumber Ltd., 2014, retrieved from <https://cucumber.io/>.

"Declarative vs Imperative Gherkin Scenarios for Cucumber," Steven Thomas, It's a Delivery Thing, Dec. 16, 2013, retrieved from <http://itsadelieverything.com/declarative-vs-imperative-gherkin-scenarios-for-cucumber>.

"Imperative vs Declarative Scenarios in User Stories," Ben Mabey, May 19, 2008, retrieved from <http://benmabey.com/2008/05/19/imperative-vs-declarative-scenarios-in-user-stories.html>.

"Imperative vs. Declarative Programming—Pros and Cons," Adrian Kashivskyy, retrieved Dec. 15, 2015 from <https://www.netguru.co/blog/imperative-vs-declarative#>.

"Behaviour Driven Development with Cucumber for Java," Thomas Sundberg.

"The Cucumber for Java Book," The Pragmatic Bookshelf, retrieved Nov. 16, 2015 from <https://pragprog.com/book/srjcuc/the-cucumber-for-java-book>.

"The world's most misunderstood collaboration tool," Aslak Hellesøy, Cucumber Ltd., Mar. 3, 2014, retrieved from <https://cucumber.io.blog/2014/03/03/the-worlds-most-misunderstood-collaboration-tool>.

"Writing Features—gherkin language," Behat, retrieved Dec. 17, 2015 from <http://docs.behat.org/en/v2.5/guides/1.gherkin.html>.

"The Cucumber for Java Book: Behaviour-Driven Development for Testers and Developers," Seb Rose, et al., The Pragmatic Bookshelf, 2015.

* cited by examiner

405

| Label | Action | Input | Options | Comment |
|---|---|---|---|---|
| Login | UIMap.Fill | UIMapDataSheet.FillCredentials | | |
| | UIMap.Act | UIMapDataSheet.ClickLogin | | |
| SearchForCompany | UIMap.Fill | UIMapDataSheet.EnterCompanySearch | | |
| | UIMap.Act | UIMapDataSheet.ClickCompanySearch | | |

410

| Label | UIMapName | CompanyID | UserID | Password | Login Button | Company SearchEdit | Company SearchButton |
|---|---|---|---|---|---|---|---|
| FillCredentials | CPToolsLoginUIMap | %CompanyID% | %UserID% | %Password% | | | |
| ClickLogin | CPToolsLoginUIMap | | | | CLICK | | |
| EnterCompanySearch | CompanyAdminUIMap | | | | | %Company ToSearch% | |
| ClickCompanySearch | CompanyAdminUIMap | | | | | | click |

FIG. 4

| PageName | UIMaps | UITables | DataSheets | WorkbooksToLoad | ObjectRepositoriesToLoad |
|---|---|---|---|---|---|
| LoginPage | CPToolsLoginUIMap | | DataSheet | CPToolsUIMap CPToolsDataSheet | CPOToolsOR_Demo.XML |
| CompanyAdminPage | CompanyAdminUIMap | | | CPToolsUIMap | CPOToolsOR_Demo.XML |
| AdministrationPage | AdministrationUIMap | UserRequestApprovalUITable | | CPToolsUIMap | CPOToolsOR_Demo.XML |

| ActionName | StartPage | GroupSheet | DataSheets | WorkbooksToLoad | ObjectRepositoriesToLoad |
|---|---|---|---|---|---|
| Login | LoginPage | GroupInstructionSheet | UIMapDataSheet | CPToolsGroupSheet | |
| SearchForCompany | CompanyAdminPage | GroupInstructionSheet | UIMapDataSheet | CPToolsGroupSheet | |

| StartPage | TargetPage | ActionName |
|---|---|---|
| HomePage | CreateUserPage | NavigateToCreateUser |
| HomePage | CreateCompanyPage | NavigateToCreateCompany |

CODELESS SYSTEM AND TOOL FOR TESTING APPLICATIONS

TECHNICAL FIELD

One or more aspects of the disclosure generally relate to computing devices, computing systems, and computer software. In particular, one or more aspects of the disclosure generally relate to computing devices, computing systems, and computer software that may be used as a tool for testing applications, such as a code testing tool.

BACKGROUND

With wide adoption of agile development methodologies, behavior-driven development (BDD) and various systems and tools supporting it have become more and more popular. Such systems and tools provide a bridge between natural language constructs (e.g., English-like sentences describing features, user stories, and the like) and automated tests. However, these systems and tools do not come out of the box with a built-in backend automation system, and integration with an external automation tool or framework is typically used. Known implementations of such integrations involve heavy coding, especially when it comes to supporting domain-specific languages (DSL). These solutions are less efficient (e.g., less time efficient), require strong backend system development skills, and limit adoption of such solutions into agile development. Many of those implementations also do not scale up well, and suffer from lack of robustness and from poor maintainability.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

The proposed system and tool for testing applications eliminates certain types of coding, while automating behavior-driven development (BDD) scenarios. BDD is a development methodology based on communication between the business users, the developers, and the testers. To enable collaboration between teams, including product development teams, Domain Specific Language (DSL) and declarative styles of DSL features may be used. Solutions described herein enable quick implementation of BDD automation (resulting in time savings) and achieves high levels of scalability, robustness, maintainability, flexibility, and efficiency of a cumulative solution. The solution extends the possibilities of using automation in a current agile development iteration, allows further shift left in testing, and reaches maximal first pass automation. For example, scripting may begin from user interface specifications without using application code, automated scripts may be used for first pass testing, and automation scripts may be used for initial testing. It also allows development teams to reap the benefits of automation for their own testing, without having to spend time on writing the automation code first.

Aspects described herein may relate to an application code testing computing device, which may be configured to run an application code testing plug-in. The application code testing computing device may receive a set of instructions for testing one or more user interface pages of an application under test. The application code testing computing device may determine that the set of instructions is written in a first format, and the computing device may parse the set of instructions to determine an action to perform and to determine data to use for the action to perform in response to determining that the set of instructions is written in the first format. The first format may comprise an imperative scenario written in Gherkin format or a declarative scenario written in Gherkin format. Systems described herein may convert the determined action to perform to a second format to generate a converted action to perform and/or convert the determined data to use for the action to perform to the second format to generate converted data. The application code testing computing device may send, to an application framework, the converted action to perform and the converted data.

In some aspects, parsing the set of instructions to determine the action to perform may comprise determining, in the set of instructions, a location of a trigger indicating the action to perform. Based on the location of the trigger indicating the action to perform, it may be determined that text in the set of instructions following the trigger comprises a name of the action to perform. Additionally or alternatively, parsing the set of instructions to determine the data to use for the action to perform may comprise determining, in the set of instructions, a location of a trigger indicating the data to use for the action to perform. Based on the location of the trigger indicating the data to use for the action to perform, it may be determined that text in the set of instructions following the trigger comprises a name or a location of a data sheet storing the data to use for the action to perform.

The application framework described herein may comprise a mapping database configured to map one or more user interface elements on a first user interface page of the application under test to one or more of a second user interface page of the application under test or one or more user interface elements on the second user interface page. In some aspects, the set of instructions may be configured to test a login page of the application under test, the action to perform may comprise a login action, and the data to use for the action to perform may comprise credentials.

The system and method described herein may comprise determining a target interface page of the one or more user interface pages to test and/or determining a current interface page of the one or more user interface pages. Responsive to a determination that the current interface page is not the target interface page, the method may comprise accessing navigation data from a navigation catalog. The navigation data may be usable to transition the application under test from the current interface page to the target interface page. The method may comprise using the navigation data to transition the application under test from the current interface page to the target interface page. An indication of the target interface page as a current location of the application under test may be stored.

BRIEF DESCRIPTION OF THE DRAWINGS

The present disclosure is illustrated by way of example and not limited in the accompanying figures in which like reference numerals indicate similar elements and in which:

FIG. 4 illustrates examples of group action data generated and transformed by one or more computing devices in which various aspects of the disclosure may be implemented.

FIG. 5 illustrates an example of data catalog and/or page catalog data generated and transformed by one or more computing devices in which various aspects of the disclosure may be implemented.

FIG. 6 illustrates an example of action catalog data generated and transformed by one or more computing devices in which various aspects of the disclosure may be implemented.

FIG. 7 illustrates an example of navigation catalog data generated and transformed by one or more computing devices in which various aspects of the disclosure may be implemented.

DETAILED DESCRIPTION

Figure 1:
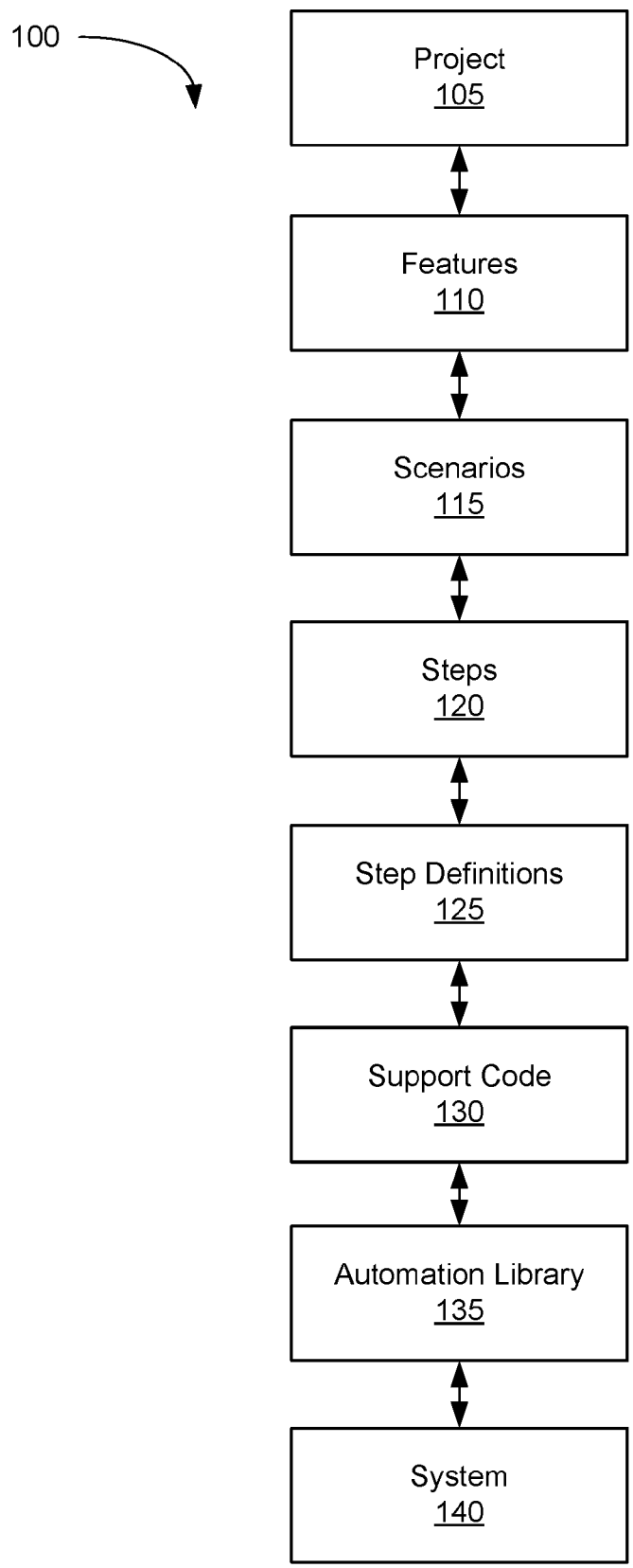
FIG. 1 illustrates an example system and framework comprising computing devices in which various aspects of the disclosure may be implemented.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

As a brief introduction, the proposed system and tool for testing applications eliminates certain types of coding, while automating behavior-driven development (BDD) scenarios. BDD is a development methodology based on communication between the business users, the developers, and the testers. To enable collaboration between teams, including product development teams, Domain Specific Language (DSL) and declarative styles of DSL features may be used. Solutions described herein enable quick implementation of BDD automation (resulting in time savings) and achieves high levels of scalability, robustness, maintainability, flexibility, and efficiency of a cumulative solution. The solution extends the possibilities of using automation in a current agile development iteration, allows further shift left in testing, and reaches maximal first pass automation. For example, scripting may begin from user interface specifications without using application code, automated scripts may be used for first pass testing, and automation scripts may be used for initial testing. It also allows development teams to reap the benefits of automation for their own testing, without having to spend time on writing the automation code first.

In some aspects, an automation framework may receive one or more instruction (e.g., an instruction sheet, such as a spreadsheet information sheet) as input and extract from the instruction sheet specific information about the action to be performed by the framework and the data that may be used for the action. That is, the instruction sheet may define actions and input data for the functionalities of the application to be tested.

In additional or alternative aspects, a tool (e.g., a code testing tool, such as a user acceptance testing tool) that supports BDD may be used, such as Cucumber or any other tool that supports BDD. The code testing tool may be used to perform regression testing on application code, such as a user interface (UI) application code. The UI application may comprise a web-based application. With some development tools, steps to be taken by the BDD automation framework may be written in, for example, natural text or language (e.g., a humanly readable plain text format). While the steps are written in a different format, the steps may indicate essentially the same information as other development tools, such as the action or actions to be performed and with what data to perform the action. In order to integrate a code testing tool with a certain framework (e.g., a UI Maps framework), the information may be converted to a format acceptable by the framework. The UI Maps framework may comprise an application or a plurality of applications used to generate one or more UIs. For example, the UI Maps framework may comprise the UI Maps framework and associated components described in U.S. Pat. No. 9,189,377, which is hereby incorporated by reference in its entirety. The UI Maps framework may also provide automated testing for UI applications. Automating new test cases as described herein might not require any coding.

FIG. 1 illustrates an example system and framework comprising computing devices in which various aspects of the disclosure may be implemented. The framework 100 may comprise a project 105, such as an application to be tested or other project. The framework 100 may comprise features 110. The features 110 may comprise a user story and/or test definition files. The framework 100 may comprise scenarios 115. The scenarios 115 may comprise acceptance criteria and/or tests for a given feature. The framework 100 may comprise steps 120. The steps 120 may comprise actions (e.g., operations) to be performed to execute a particular scenario. The actions to be performed may be based on certain format or syntax (e.g., a first format), such as Given/When/Then syntax as used in, for example, the gherkin language.

The framework 100 may comprise step definitions 125. The step definitions 125 may comprise code, such as glue code, that maps a business-readable language of each step 120 into code to carry out the action being described by the step. Step definitions 125 may be short, such as a definition directing the execution flow to support code. However, the coding may also be done in the step definitions 125 themselves. The framework 100 may comprise support code 130. The support code 130 may comprise the part of the code that knows how to carry out common tasks on the system. Most of the testing work may be done with the support code 130. In some aspects, the role of the support code 130 may be performed by a UI Maps framework. The framework 100 may comprise an automation library 135. The automation library 135 may enable interaction with the system or application being tested (e.g., the system 140).

The code testing tool described herein may be used by the framework 100 as an interface between business-facing components, such as the features 110, scenarios 115, and steps 120, and technology-facing components, such as the step definitions 125, support code 130, and automation library 135.

The code testing tool may comprise a plug-in module (which may include a driver) designed to achieve one or more of the goals described herein. Features and components of the code testing tool and/or the plug-in module will be described in further detail in the examples below.

Figure 2:
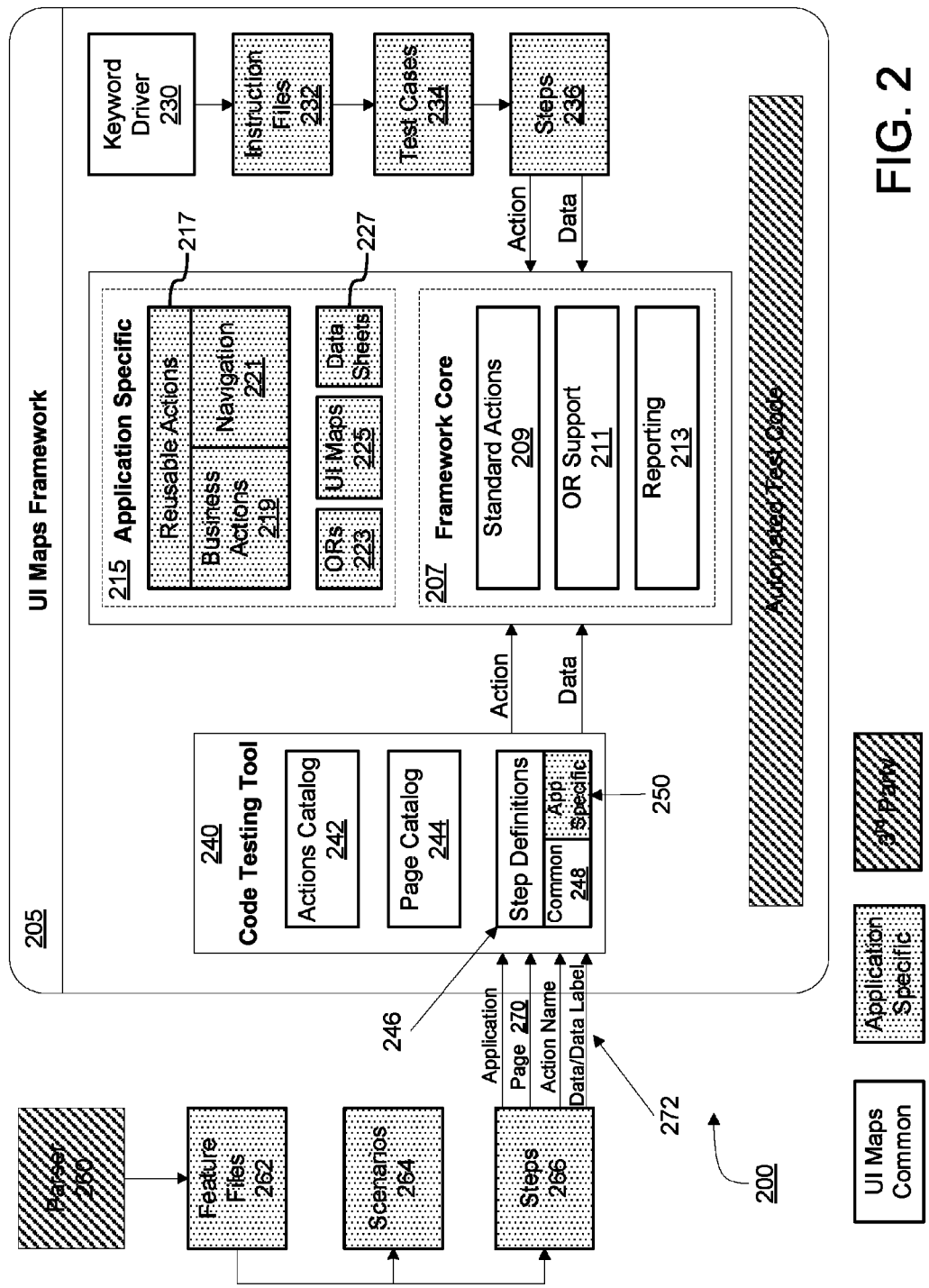
FIG. 2 illustrates another example system and framework comprising computing devices in which various aspects of the disclosure may be implemented.

FIG. 2 illustrates another example system and framework comprising computing devices in which various aspects of the disclosure may be implemented. The system 200 may comprise a UI Maps framework 205, which may comprise a framework core 207. The framework core 207 may be where the vast majority of automation code is located. The code may be used for codeless automation.

The framework core 207 may comprise standard actions 209, which may comprise one or more standard actions that may be taken by the system 200. Exemplary actions include, but are not limited to, basic UI controls (e.g., UIMap, such as UIMap.Fill, UIMap.Verify, UIMap.Act, and the like, or UITable) and also actions supporting various table-related tasks. Exemplary table-related tasks include, but are not limited to filtering and sorting various columns, searching for rows based on their content, verifying content in tables, rows, or cells, editing any table elements and acting on them, selecting rows, expanding rows, or deleting rows, among other actions.

The framework core 207 may comprise an object repository (OR) support tools 211 used to create and/or work with object repositories. Object repositories will be described in further detail below. The framework core 207 may comprise a reporting component 213. Reporting 213 may be used to generate one or more reports for analysis, and may support various types or formats of reports. The reporting component 213 may allow report customization to the level of detail used for successful analysis of execution results.

The framework 205 may comprise an application specific component 215, which may be separate from the framework core 207. The application specific component 215 may be used to automate one or more new application using the framework core 207 and other add on features.

The application specific component 215 may comprise data sheets 227, which may be spreadsheets or other tables. The data sheets 227 may comprise the data to be used for test scenarios. For example, the data sheets 227 may define the relevant data to be used for each UI control in each test step. The test scenarios 264 and steps 266 may list the test cases to be executed, as will be described in further detail below.

The application specific component 215 may comprise object repositories (ORs) 223. The ORs 223 may contain information about UI controls and their properties (e.g., metadata) that allow identifying the controls. The controls may be grouped by pages. By storing the information at a central location, and separately from the code, automation maintainability may be improved.

The application specific component 215 may comprise UI maps 225. The UI maps 225 may comprise the UI maps described in U.S. Pat. No. 9,189,377, which is hereby incorporated by reference in its entirety. The UI maps 225 may describe properties or roles of UI controls, such as whether the control is dynamic or static, what controls can be used to identify the page, and what controls represent messages, labels, and the like. That is, UI maps 225 may define (e.g., map) one or more of the elements (e.g., all of the elements) on a UI screen, to their descriptions and/or relationships. The UI maps 225 may additionally or alternatively indicate relationships between UI controls and pages, supporting synchronization. For example, if a user of the framework clicks on a particular button in the UI, the UI maps 225 data may be used to determine what message, what popup, what other page is to be displayed. The UI maps 225 data may also indicate how long the system waits until displaying the information. Relationships may also be determined based on which other controls appear depending on the selection the user makes. For example, if the user places a cursor (e.g., mouse) over a particular control, a tool tip might or might not be displayed based on the information in the UI maps 225. The UI maps 225 may also define controls with special roles, such as table filters, sorting icons, and the like. The UI maps 225 may also identify default controls to handle popups, and other graphical user interface elements. In other words, and as described above and herein, the application framework may comprise a mapping database configured to map one or more user interface elements on a first user interface page of the application under test to one or more of a second user interface page of the application under test or one or more user interface elements on the second user interface page.

The application specific component 215 may comprise reusable actions 217. The reusable actions 217 may comprise business actions 219, such as DSL operations, and navigation operations 221. These actions may be implemented as separate groups of steps in instruction sheets of special type, and coding might not be needed.

The framework 205 may comprise one or more components that may process data after execution is performed by the framework core 207. For example, the framework 205 may comprise a keyword driver 230 that provides keywords for use by an instruction (e.g., data) sheet or file 232 (e.g., in a spreadsheet or table format). The instruction sheet 232 may be read, e.g., row by row, to identify test cases 234 listed in the instruction sheet. The steps 236 of each test case 234 may be processed. For each step 236, the framework 205 may extract information about the action to be executed and the data to be used for the action. That is, these pieces of information may be passed to the framework core 207 and/or application specific component 215 for processing. The information may be sent to the framework core 207 and/or application specific component 215 in a format that the framework understands. For example, the action information may be formatted as UIMap.Fill or UITable.Filter, and the data may be formatted as <DataSheetName, RowNumber/RowLabel>.

The framework 205 may comprise a code testing tool 240, which may be a plug-in. As previously described, steps processed by the code testing tool 240 may be written in humanly readable plain text form. The data sent from the code testing tool 240 to the framework may be similar or essentially the same as the data received via the keyword driver 230, such as what actions are to be performed and with what data. In order to integrate the code testing tool 240 with the UI Maps framework 205, the code testing tool 240 may convert the information (e.g., action to be performed and/or with what data) to a format usable by the framework 205. For example, the code testing tool may convert an action to perform from a first format (e.g., gherkin format) to a second format to generate a converted action to perform and convert the data to use for the action to perform to the second format to generate converted data. The code testing tool may send, to an application framework, the converted action to perform and the converted data, as will be described in further detail below.

The code testing tool 240 may determine (e.g., monitor or keep track of) the context of each operation, such as which application is being tested, which page the tool 240 is on, and the like. Determining the context information might not be repeated in each step, and may be performed (e.g., by mentioning or otherwise including the command) at the beginning of a feature or a scenario 264.

The code testing tool 240 (and components therein) may use a set of instructions (e.g., one or more feature files 262), which may identify a specific page 270 and/or an action (e.g., identified by an action name) to perform if the user is on the specific page 270. For example, an exemplary feature file (e.g., a gherkin feature file) may state "Given the user is on page <PageName>," perform an action identified by an action name. In some aspects, the feature files 262 may replace the instruction sheets previously described, and therefore be used to generate test scripts that are in a more human readable (e.g., codeless) format than the instruction sheets. A test script may be defined in the form of a feature file, and the test steps for these feature files may follow a set of pre-defined step formats.

The feature files 262 may be formatted in either imperative style or declarative style. That is, aspects described herein may support both imperative and declarative styles, and in a codeless manner.

An exemplary imperative style is described as follows:
Scenario: Login into UITools (Imperative style)
Given the application is UITools
When I navigate to Login page
And I fill in "CompanyID" with "company1"
And I fill in "UserID" with "user1"
And I fill in "Password" with "cash01pro"
And I press "Login"
Then I should get to Home page
An exemplary declarative style is described as follows:
Scenario: Login into UITools (Declarative style)
Given the application is UITools
When I try to login providing valid credentials
Then I should get to Home page In the above example, the application may comprise "UITools," the action name may comprise a "login" action, the data label may comprise "valid credentials," and the page may comprise the "Home page."

The code testing tool 240 may determine whether the current page that the user is on is the specified page 270 (e.g., a page identified as <PageName> as described above). If not, the code testing tool 240 may use a navigation catalog to find a way (e.g., the shortest way) to get from the current page to the target or specified page 270. The code testing tool 240 may execute one or more navigation actions provided in the navigation catalog. The navigation catalogs may be used to support transparent navigation to the specified page.

The code testing tool 240 may comprise an actions catalog 242. The actions catalog may be used by the code testing tool 240 to convert humanly readable action names (e.g., custom action names and/or DSL action names) into other formats of reusable actions that are recognizable by the framework 205, such as the reusable actions 217. Some simple actions might not need to use an action catalog to be converted to other formats. For example, actions such as selecting, clicking, and checking that may be converted from humanly readable formats to, for example, other formats, such as (respectively) filling, acting, and verifying (which may be the corresponding UI Maps actions). These and other simple steps may be performed directly in steps definitions 246 without the help of an action catalog 242.

By using action catalogs 242, codeless DSLs may be supported according to one or more features described herein. Both navigation catalogs and action catalogs 242 may be based upon the concept of reusable actions (e.g., reusable actions 217). Each reusable action may represent a group of more granular instructions coming with their own data and taking predefined parameters as input.

Data information for conversions may come from steps to step definitions 266 in the form of direct data or as a data label 272. The data label 272 might not be standard for some code testing tools. However, data labels 272 may be used for various aspects described herein to allow externalizing data and keeping it separately from the feature files 262 of the code testing tools. In other words, support for both direct data input methods and externalized data may be provided using aspects described herein. Supporting data externalization may, for example, allow using different data for different test environments.

To use data labels, page catalogs 244 or data catalogs may be implemented. For a given page name, the page catalog 244 may allow finding the corresponding UI Map 225 and what data sources are associated with that page. That is, the page catalog 244 may indicate where the system may look for the provided data label 272. It may also point to the navigation action that may be used to navigate to the specified page 270.

An extensive set of step definitions 246 covering one or more code testing scenarios 264 is provided herein. These step definitions 246 may be short, and may incorporate calls to action catalogs 242 and data catalogs, if needed. The step definitions 246 may also redirect the flow to the UI Maps framework core 207. Though step definitions 246 may be common for a plurality of applications (e.g., common step definitions 248) to be tested (e.g., all of the applications), some applications may use additional step definitions (e.g., application specific step definitions 250) to support sentences that are specific to those applications. The implementation of these custom definitions may be lightweight, and in some instances may redirect to existing step definitions.

A parser 260 may parse test steps to identify the text and their corresponding actions. In some aspects, the parser 260 and/or another parser may parse a set of instructions (e.g., a feature file) to determine an action to perform and to determine data to use for the action to perform.

One or more of the components illustrated in FIG. 2 may optionally comprise a particular type of component, such as a UI maps common component, an application specific component, or a 3$^{rd}$ party component, as illustrated in FIG. 2. However, the components illustrated in FIG. 2 are not limited to their illustrated configuration and may each comprise a different type of component.

An example of a login scenario using the code testing tool 240 will now be described.

| Step | Actions |
|---|---|
| Given that Login page is displayed | 1) Search in the Data Catalog for the UIMap corresponding to the "Login" page name.<br>2) Verify with the data from UIMap if the page is visible.<br>3) If it is visible, the Given condition is satisfied.<br>4) If the page is not visible, determine the corresponding Navigate Action using Page catalog 244, and execute the action in order to get to the page. |
| When user tries to perform [login] with [valid credentials] | 1) The word "perform" indicates that a Reusable Action 217 is to be executed.<br>2) Text following the "perform" keyword in square brackets may comprise the name of the action. Actions Catalog 242 may be used to find the corresponding action.<br>3) Presence of keyword "with" following the action name may indicate that the data to be used for this operation is provided.<br>4) Presence of text surrounded by square brackets may indicate that data is identified by a data label. |

-continued

| Step | Actions |
|---|---|
|  | 5) For Login page, using Page Catalog 244, determine corresponding data sheet 227 with "valid credentials" label on it |
|  | 6) Action and Data information is passed from the code testing tool 240 to the framework 207, and executed. |
| Then confirm that [login is successful] | 1) The keyword "confirm" indicates use of UIMap. Verify operation |
|  | 2) That keyword is followed by data label within [ ]. |
|  | 3) Last page used was Login page, so, again, find "login is successful" label on data sheets 227 belonging to that page. |
|  | 4) Action and Data information is passed from the code testing tool 240 to the framework 207, and executed. |
|  | 5) In the process of execution of that action, confirm that another page was reached, as expected. Determine and store indicator of that new page as the current location in the application. |

The exemplary set of instructions above may be parsed to determine an action to perform. For example, a parser may determine, in the set of instructions, a location of a trigger (e.g., the term "perform" or any other trigger term) indicating the action to perform. Based on the location of the trigger indicating the action to perform, it may be determined that text in the set of instructions following the trigger comprises a name of the action to perform. For example, the action to perform may comprise a login action.

The exemplary set of instructions above may be parsed to determine the data to use for the action to perform. For example, a parser may determine, in the set of instructions, a location of a trigger (e.g., the term "with" or any other trigger term) indicating the data to use for the action to perform. Based on the location of the trigger indicating the data to use for the action to perform, it may be determined that text in the set of instructions following the trigger comprises a name or a location of a data sheet storing the data to use for the action to perform. For example, the data to use for the action may comprise credentials, such as valid credentials.

Various other steps, as listed in the table below, may be supported by aspects described herein.

| StepFormat | Step Parse Flow | Example |
|---|---|---|
| ^(.*(?:fill\|fills\|enter\|enters\|select\|selects\|set\|input\|insert\|insert).*\\[(.+)\\].*)$ | 1) The keyword enter or input or select or set or insert or fill followed by a data label within square brackets indicates that it is a FILL operation on a data label<br>2) Final operation performed is UIMap.Fill on DataSheet; Data Label | When the user tries to enter [valid credentials] |
| ^(.*(?:click\|clicks) (?:on)?(.+))$ | 1) The keyword enter or input or select or set or insert or fill followed by a keyword in quotes which is then followed by "on" or "in" indicates that it is a FILL operation with custom user data<br>2) Final operation performed is UIMMap.Fill on the object name with given data | When the user tries to enter "username" in the username field |
| ^(.*submits?.*\\[(.+)\\]).*$ | 1) The keyword click followed by an "on" keyword indicates that it is a click operation with text following the "on" being the object name<br>2) Final operation performed is click on the object | When the user tries to click on login button |
|  | 1) The keyword submit followed by data label in square brackets indicates that it is an act operation on a data label<br>2) Final operation performed is UIMap.Act on the DataSheet; DataLabel | When user tries to submit the [login information] |
| ^(.*verify that (.+) is displayed\|(?:not displayed)\|visible\|(?:not visible)\|enabled\|(?:not enabled)\|disabled\|(?:not disabled))(?: and (?:contains\|has).*\"(.+)\" .*)?)$ | 1) The keyword "verify that" followed by (displayed\|visible\|enabled\|disabled) indicates that it is a verify state operation on a control<br>2) Final operation is UIMap.Verify on the given control with the given action<br>OR<br>1) The keyword "verify that" followed by (displayed\|visible\|enabled\|disabled) followed by "and contains" indicates that it is a verify state operation on a control followed by a verify text operation<br>2) Final operation is UIMap.Verify on the given control with the given action and data to verify | Then verify that login button is displayed<br>Then verify that login button is displayed and contains text "login" |
| ^([d\|D]efault values of the (.+) are displayed)$ | 1) Call UIMap.VerifyDefaults on the UIMap name passed<br>2) UIMap name may be one of the UI Maps of the current page | When default values of the login uimap are displayed |

-continued

| StepFormat | Step Parse Flow | Example |
|---|---|---|
| ^(.*[v\|V]erify that default values of the (.+) are displayed)$ | Same as above | Then verify that defaults values of the login page are displayed |
| verify that [.*] | 1) The keyword confirm indicates that it is a UIMap.Verify operation<br>2) That keyword is followed by a valid data label within [ ]<br>3) Final operation performed is UIMap.Verify on DataSheet; DataLabel | Then confirm that [login is successful] |
| ^(.*(?:performs?\|executes?).*\\[(.+)\\] with. *\\[.+)\\])$ | 1) The keyword performs or executes indicates that this is a custom action to be performed by the execute group keyword with a custom data label<br>2) Text following the perform keyword in square brackets is the execute group label to find<br>3) Presence of keyword "with" following the action name indicates that the data to be used for this operation is specified<br>4) Presence of text surrounded by square brackets indicates that data is coming from a data label<br>5) Final operation performed is Service.ExecuteGroup on GroupSheet; ActionLabel with given data | when user tries to perform [login] with [valid credentials] |
| (.*(?:performs?\|executes?).*\\[(.+)\\]$ | 1) The keyword performs or executes indicates that this is a custom action to be performed by the execute group keyword<br>2) Text following the perform keyword is the execute group label to find<br>3) Final operation performed is Service.ExecuteGroup on GroupSheet; ActionLabel | When user performs action [login] |
| ^(.*(?:performs?\|executes?).*\\[(.+)\\] with. *\\[.+)\\])$ | 1) The keyword performs or executes indicates that this is a custom action to be performed by the execute group keyword<br>2) Text following the perform keyword is the execute group label to find<br>3) Presence of keyword "with" followed by a string not containing "[" or "]" indicates that this operation is to be performed with inline data set<br>4) Final operation performed is Service.ExecuteGroup on GroupSheet;ActionLabel with inline data | When user performs action [login] with user name as "" and password as "" |
| ^(.*(?:performs?\|executes?).*\\[(.+)\\] with$ | 1) The keyword performs or executes indicates that this is a custom action to be performed by the execute group keyword<br>2) Text following the perform keyword is the execute group label to find<br>3) Presence of keyword "with" at the end of the sentence indicates that a data table is being provided to override the data being used by the execute group keyword<br>4) Create variables for the data table parameters in the varset section of the execute group keyword so that the values being used by the execute group is overwritten | When user performs action [login] with \|username\|company\| password\|<br>\|a\|B\|C\| |
| ^(.*(?:[l\|L]ogin) to .*\\[(.+)\\] with ((?:(:![\\[\|\\]]).)*))$ | Login with inline data, parsing similar to execute group | When Login to the [CPO application] with UserName as "user" and company as "cpm1" and password as "pass" |

-continued

| StepFormat | Step Parse Flow | Example |
|---|---|---|
| ^(.*(?:[Ll]ogin) to .*\\[(.+)\\] with.*\\[(.+)\\])$ | login with data label data, parsing similar to execute group | When Login into [CPO application] with [valid credentials] |
| ^(.*(?:[Ll]ogin) to .*\\[(.+)\\])$ | login parsing similar to execute group | When Login to the [CPO application] |
| ^(.*(?:[Ll]ogin) to .*\\[(.+)\\]with)$ | login with external data table data, parsing similar to execute group | When Login to the [CPO application ] with \|username\|password\| \|user\|pass\| |
| ^(.*is on the(.+)page$ | 1) Search in the page catalog for uimaps corresponding to the page name passed here<br>2) Try to verify if any of the uimap is visible<br>3) If none is visible use the Navigate Action field's data from page catalog as the group execution keyword and perform service.execute group on it | Given that user is on admin page |
| ^((.+)page is displayed)$ | 1) Search in the page catalog for uimaps corresponding to the page name passed here<br>2) Try to verify if any of the uimap is visible<br>3) If none is visible use the Navigate Action field's data from page catalog as the group execution keyword and perform service.execute group on it | Given that admin page is displayed |
| ^(.*navigate(?:s)? to(.+)page)$ | 1) Search in the page catalog for uimaps corresponding to the page name passed here<br>2) Try to verify if any of the uimap is visible<br>3) If none is visible use the Navigate Action field's data from page catalog as the group execution keyword and perform service.execute group on it | When user navigates to admin page |
| ^.*verify that (.+) page is displayed | 1) Seareh in the Page catalog for the page name and get the corresponding UIMaps<br>2) Go through each UIMap to verify it's presence, as soon as one is found page visibility is verified | Then verify that admin page is displayed |

One or more computing device (e.g., a computer server, desktop computer, laptop computer, tablet computer, other mobile devices, and the like) may be used in an example computing environment according to one or more illustrative embodiments of the disclosure. The computing device may have a processor for controlling overall operation of the server and its associated components, including for example random access memory (RAM), read-only memory (ROM), input/output (I/O) module, and memory.

An I/O module may include, e.g., a microphone, mouse, keypad, touch screen, scanner, optical reader, and/or stylus (or other input device(s)) through which a user of the computing device may provide input, and may also include one or more of a speaker for providing audio output and a video display device for providing textual, audiovisual, and/or graphical output. Software may be stored within memory and/or other storage to provide instructions to the processor for enabling the computing device to perform various functions. For example, memory may store software used by the computing device, such as an operating system, application programs, and an associated database. Additionally or alternatively, some or all of the computer executable instructions for the computing device may be embodied in hardware or firmware (not shown).

The computing device may operate in a networked environment supporting connections to one or more remote computers, such as terminals. The terminals may be personal computers or servers that include any or all of the elements described above with respect to the computing device. The network connections include a local area network (LAN) and a wide area network (WAN), but may also include other networks. When used in a LAN networking environment, the computing device may be connected to the LAN through a network interface or adapter. When used in a WAN networking environment, the computing device may include a modem or other network interface for establishing communications over the WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device and/or terminals may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Another illustrative system for implementing methods according to the present disclosure may be used. The system may include one or more workstations. The workstations may be used by, for example, agents or other employees of an institution (e.g., a financial institution) and/or customers of the institution. Workstations may be local or remote, and are connected by one or more communications links to computer network that is linked via communications links to the server. In the system, the server may be any suitable server, processor, computer, or data processing device, or combination of the same.

A computer network may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links may be any communications links suitable for communicating between the workstations and the server, such as network links, dial-up links, wireless links, hard-wired links, and the like.

A computing device may be used to create a test script for the code testing tool, which may comprise a plug-in or driver. Generating the test script may involve performing one or more of the steps illustrated in FIG. 3.

Figure 3:
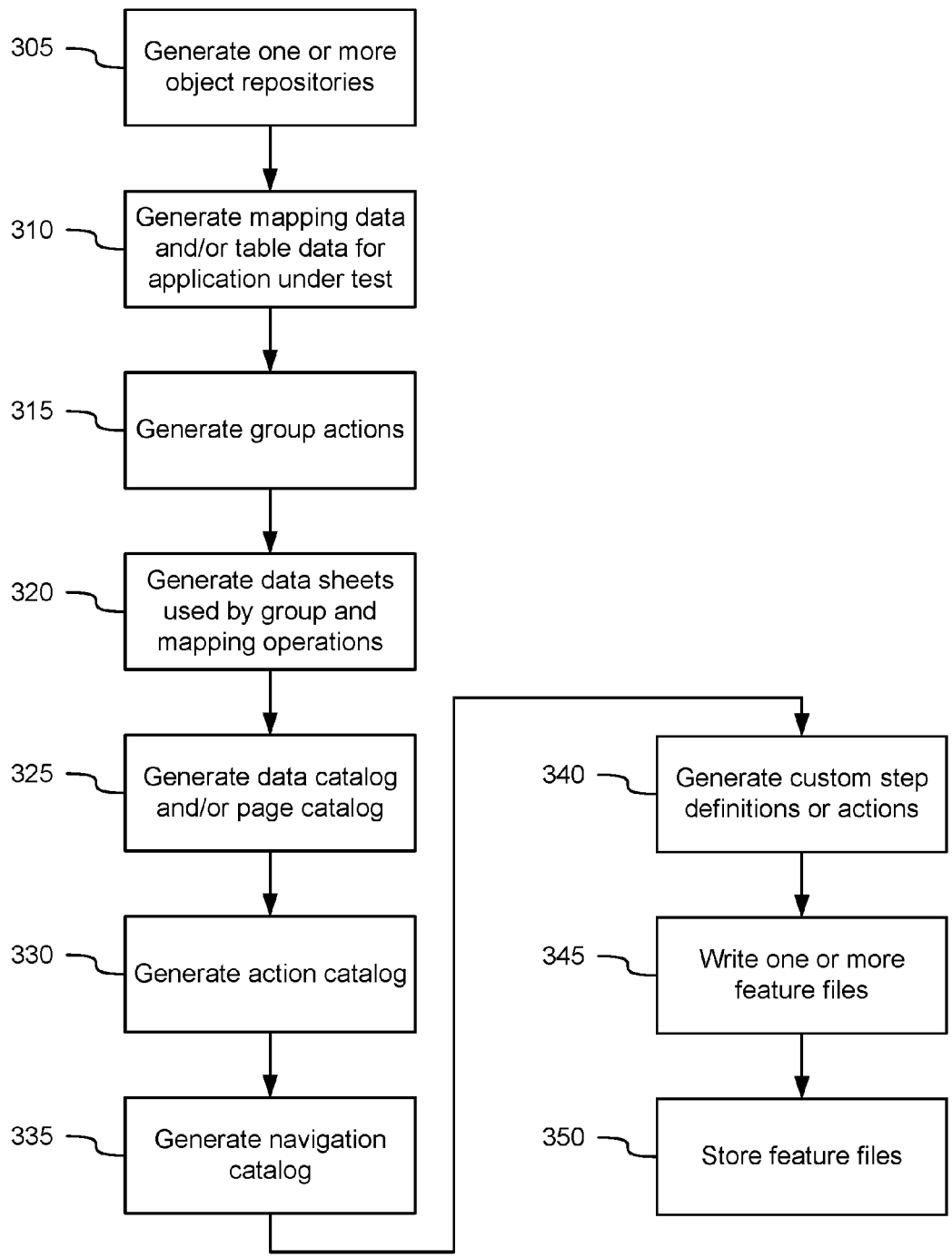
FIG. 3 illustrates an example of at least a portion of a flow diagram for testing applications, such as application code, in which various aspects of the disclosure may be implemented.
Figure 8:
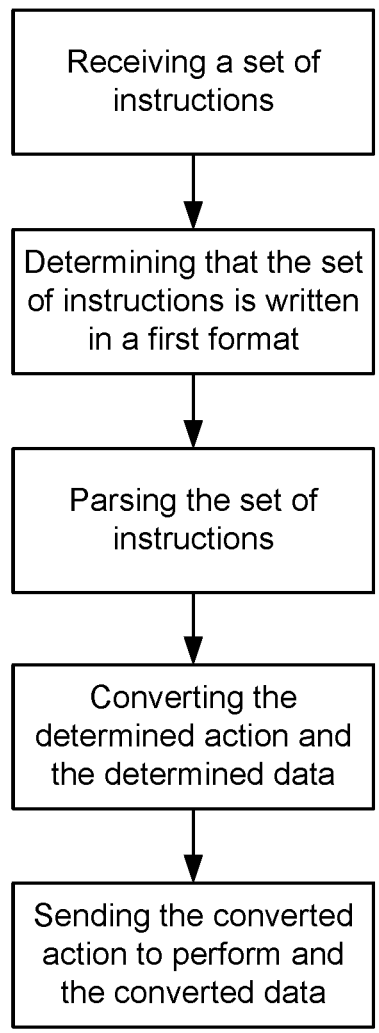
FIG. 8 illustrates an example of processing a set of instructions for testing one or more user interface pages of an application under test by one or more computing devices in which various aspects of the disclosure may be implemented.

FIG. 3 illustrates an example of at least a portion of a flow diagram for testing applications, such as application code, in which various aspects of the disclosure may be implemented. In step 305, the computing device may generate one or more object repositories (e.g., the object repositories 223 described with reference to FIG. 2) for the objects in the application under test.

In step 310, the computing device may generate mapping data and/or table data for the application under test. As previously described, the mapping data may map one or more elements on a UI screen to their respective descriptions and/or relationships, indicate relationships between UI controls and pages, how long the system waits before displaying information, controls with special roles (e.g., table filters, sorting icons, and the like), default controls (e.g., to handle popups or other GUI elements), and the like. The mapping data may be indicated in a UI Maps component for the application under test. As previously described, the table data may include table-related tasks, such as filtering and sorting various columns, searching for rows based on their content, verifying content in tables, rows, or cells, editing any table elements and acting on them, selecting rows, expanding rows, or deleting rows, among other actions. The table data may be indicated in a UI Tables component for the application under test.

A UI map may be defined for each page or section of the application that will be automated. A UI map might not map directly to a page of the application, and UI maps may also be created for certain sections of a page. For example, a navigation bar on a page might not be dependent on any page, but may be visible from all the pages. Accordingly, a UI map may be created for the navigation bar itself without defining the same navigation control for each page.

The name of a UI map worksheet may end with a particular suffix, such as "UIMap." Exemplary UI map worksheets may include LoginUIMap, AdminUIMap, and the like. Using the same suffix may help in distinguishing the worksheets containing data from the ones containing the actual UI maps.

Multiple UI maps worksheets may be created inside the same workbook. For example, a workbook each can be created for different modules of the application, such as an Admin module, a Cart module, a User module, and the like. The UI maps belonging to a module may be stored as a worksheet in its module's workbook (a group of worksheets).

In step 315, the computing device may generate group actions (e.g., operations), such as for operations that are common among a plurality of applications (e.g., a group of applications). The group operations may be stored in a group sheets data structure.

A group action may comprise a set of reusable instructions, such as the reusable actions 217 described with reference to FIG. 2. If an operation is performed multiple times from different test scripts or the same, then instead of defining the same steps again, a reusable action may be created and called each time the same action is to be performed.

Each group action may be defined in a worksheet, which may comprise a group instruction sheet. Multiple group actions may be defined in the same worksheet depending on the categorization. For example, group actions on the admin module may be defined in a worksheet called AdminGroupInstructionSheet worksheet. Each group's actions may be separated by a blank line, as illustrated in FIG. 4. FIG. 4 illustrates examples of group action data 405 generated and transformed by computing devices in which various aspects of the disclosure may be implemented.

The instructions defined for a group action might not use constant data in their data sheets, but may instead use variables. When the computing device wants to use the group action, it may set the values of the variables and use the group operation as if it was defined for its particular test. FIG. 4 also illustrates second exemplary group actions 410.

If a group operation can be performed from only one page (and not multiple pages), the data for the group operation may be stored inside the data sheet for the UI map belonging to that page.

In step 320, the computing device may generate (e.g., define) data sheets used by the group operations and the mapping operations generated in steps 310 and/or 315. For example, the data sheet generated by the computing device may comprise the data sheets 227 described with reference to FIG. 2, and the data sheets 227 may list test cases to be executed and indicate what actions are to be performed in the test cases, and what data may be used for each action.

A data sheet may be defined for each UI map and may contain the details of common operations that may be performed on that UI map. The same data sheets may be used by the group actions to specify their instructions. Separate data sheets may be defined for certain types for data. For example, a data sheet may be defined for login credentials, another data sheet can be defined for user IDs, and the like.

In step 325, the computing device may generate data and/or page catalog files. As previously explained, the data and/or page catalog files (e.g., page catalog 244 described with reference to FIG. 2) may indicate which data sources are associated with a particular page. The computing device may use the page catalog file to find relevant data.

A page catalog may comprise a catalog containing information about the pages in the application (e.g., specifically, the pages to be automated). The page catalog may be defined in the form of a worksheet and the name of the worksheet may be, for example, "PageCatalog."

FIG. 5 illustrates an example of data catalog and/or page catalog data 505 generated and transformed by one or more computing devices in which various aspects of the disclosure may be implemented.

The page catalog 505 may comprise one or more columns. The PageName column may specify the name of the page for which the information is being provided. Any name can be decided for an actual page in the application, e.g., as long as the same name is also being used in the feature file while referring to that page. Entries in the PageName column may be unique. When the computing device begins execution of a feature file, the framework may assume that the first page defined in the page catalog is the current page. Accordingly, the first page defined in the page catalog may be the page that appears when the application is started, such as the LoginPage.

There may be cases when multiple features files might not have the same start page. In these cases, assuming that the first page in the page catalog is the start page may be a wrong assumption. Accordingly, the computing device may be able to explicitly specify the current page. Steps in the PageStep-Definitions section may be used to switch the current page to another page. If the start page for page features is not the same, the computing device may use any one of these steps as the first step in the test scenario to specify the page that the computing device is on.

A special page (e.g., a default page) may be defined in the page catalog. This page may be assumed to be the start page when no page name is specified in the StartPage column of the action catalog or the navigation catalog. The default page may be used to denote a part of the application that is available from a plurality of other pages in the application (e.g., every other page). For example, the navigation bar of an application may be displayed on each page, and the actions from the navigation bar may be performed from any page. Accordingly, the value of Start Page for such actions may be skipped in the action catalog or the navigation catalog. In these cases, the computing device may assume that the action may be performed from the default page, which is defined in the page catalog.

The UIMaps column may specify the list of UIMaps that belong to the current page. Any number of values can be provided, and each value may be separated by a separator, such as a semicolon (";"). The name of the UIMap worksheet may be provided. The path of the workbook containing it might not be provided.

The UITables column may specify the list of UITables that belong to the current page. Any number of values can be provided, and each value may be separated by a separator, such as a semicolon (";"). The name of the UITable worksheet may be provided. The path of the workbook containing might not be provided.

The DataSheets column may specify the list of data sheets which contain data for the current page or its UIMaps. Any number of values can be provided, and each value may be separated by a separator, such as a semicolon (";"). The name of the data sheet worksheets may be provided. The path of the workbook containing it might not be provided. The first row of each data sheet may be considered as the header row, and the first header may be "Label".

The WorkbooksToLoad column may specify the list of workbooks to load for the current page. These workbooks may contain one or more (e.g., all) of the UIMaps, UITables and DataSheets referred to by the current page. The value provided for each workbook may be the relative path of the workbook file from the resources directory of the project. Any number of values can be provided, and each value may be separated by a separator, such as a semicolon (";").

The ObjectRepositoriesToLoad column may specify the list of object repositories to load for the current page. These object repositories may contain one or more (e.g., all) of the objects referred to by the current page, or the UIMap if the UIMap has been defined in the object repository. The value provided for each object repository may be the relative path of the object repository file from the resources directory of the project. Any number of values can be provided, and each value may be separated by a separator, such as a semicolon (";").

The framework may keep track of the current page as the steps are being executed. When the execution starts, the first page that is defined in the PageCatalog may be assumed to be the current page. Accordingly, the computing device may attempt to make sure that the first page defined in the PageCatalog is the page that appears first when the execution starts. The current page can also be changed by calling a page verification step in the feature file.

Returning to FIG. 3, in step 330, the computing device may receive data, such as from developers or other users, for generating action catalog files. As previously explained, the computing device may use the action catalog files to convert humanly readable action names (e.g., operations) into other formats of reusable actions, such as the reusable actions 217 described with reference to FIG. 2. Action catalogs might not be used for simple steps, such as steps that may be performed directly via step definitions (e.g., step definitions 246).

An action catalog may contain information about the predefined actions that can be used in the test scripts (e.g., the feature file). The actions referred to in the action catalog may be defined in the form of UIMap group instructions. The action catalog may help the code testing tool by providing it information, such as the page from where the action should start, the group sheet where the action is defined, the data sheet(s) used by the instructions defined for the action, and the like. The action catalog may be defined in the form of a worksheet, and the name of the worksheet may be "ActionCatalog."

For each start page and action name entry made in the action catalog, an entry may also be made in the navigation catalog. The framework may use this information to identify which page the application is on when an action is performed.

FIG. 6 illustrates an example of action catalog data 605 generated and transformed by one or more computing devices in which various aspects of the disclosure may be implemented.

The action catalog 605 may contain several columns. The action catalog may comprise an ActionName column that specifies the name of the action. This may be the name that is used in the test script feature file to refer to the group action.

The StartPage column may specify the page from which the given action is to be performed in the application. The start page may also be defined in the page catalog. If one action can be performed from multiple pages, then multiple entries of the same action may be created with different start pages. In some aspects, two rows in the action catalog might not contain the same combination of ActionName and StartPage. The StartPage column may be left blank, in which case the default page previously described may be assumed to be as the start page for the action.

The GroupSheet column may specify the name of the group worksheet where the action is actually defined. The name of the worksheet may be specified, whereas the path of the workbook containing it might not be specified.

The DataSheets column may be used to specify the name of the data sheets used by the group action, or the data sheets containing the data specified in the instruction for this action. Any number of values can be provided, and each value may be separated by a separator, such as a semicolon (";"). The name of the data sheet worksheets may be provided. The path of the workbook containing it might not be provided. The first row of each data sheet may be considered as the header row, and the first header may be "Label."

The WorkbooksToLoad column may specify the list of workbooks to load for the current action. These workbooks may contain group sheet and data sheets referred to by the current action. The value provided for each workbook may be the relative path of the workbook file from the resources directory of the project. Any number of values can be provided, and each value may be separated by a separator, such as a semicolon (";").

The ObjectRepositoriesToLoad column may specify the list of object repositories to load for the current action. These object repositories may contain the objects referred to by the current action (e.g., all of the objects) and its instructions. The value provided for each object repository may be the relative path of the object repository file from the resources directory of the project. Any number of values can be provided, and each value may be separated by a separator, such as a semicolon (";").

Returning to FIG. 3, in step 335, the computing device may generate navigation catalog files. As previously explained, the navigation catalog may comprise one or more navigation actions used by the computing device to navigate from the current page to a target page. That is, the computing device may execute one or more of the navigation actions provided in the navigation catalog.

The navigation catalog may contain information about the page navigations that can occur in the application. The navigation catalog may indicate the sequence of group actions to be performed in order to go from one page to another. The navigation catalog may be defined in the form of a worksheet, and the name of this worksheet may be "NavigationCatalog."

For each StartPage and ActionName entry made in the action catalog, an entry may also be made in the navigation catalog. The framework may use this information to identify which page the application is on when an action is performed.

FIG. 7 illustrates an example of navigation catalog data 705 generated and transformed by one or more computing devices in which various aspects of the disclosure may be implemented.

The navigation catalog 705 may contain one or more columns. The StartPage column may specify the page from which the current navigation action begins. The value in the StartPage column may be a valid value from the page catalog. The StartPage column can also be given a blank value, in which case the start page may assumed to be the page with name "DEFAULT" from the page catalog.

The TargetPage column may specify the page at which the application reaches after performing the current navigation action. The value in the TargetPage column may be a valid value from the page catalog.

The ActionName column may specify the action which is used to go from the StartPage to the TargetPage. The value in the ActionName column may be a valid value from the action catalog.

The framework may specify where to store catalog files. For example, catalog files may be placed in the same workbook file, and the location of the workbook file may be: "resources\catalogs\TestCodeCatalog._" in the application project.

Returning to FIG. 3, in step 340, the computing device may generate (e.g., define) custom step definitions or actions if needed. The custom actions may be stored in, for example, the action catalog file, along with data for converting each custom action to another (e.g., reusable) format.

The code testing tool may define a set of pre-defined step formats, which may be used to perform operations. There may be some instances where defining a custom step can simplify the test. For such situations, custom step definitions may be written and used in the feature files. The following paragraphs will explain how to define and use custom step definitions with the code testing tool.

For tasks which cannot be easily accomplished by using the default step formats, custom step definitions can be defined. The code testing tool may track the current page on which the operation is being performed and also the page on which the user lands after performing a certain operation. However, when default steps are mixed with custom steps, keeping track of the current page might be difficult for the code testing tool. Therefore, after a call to a custom step definition from the feature file, a call may be made to any of the page step definitions steps, specifying the page on which the computing device is currently on after the custom step has performed its operations.

The step definition class file generated by the computing device may be stored inside a particular package of the application project. Inside this package, any number of sub-packages can be created by the computing device to categorize the classes.

Custom steps performed by the computing device may be reported. Each custom step definition method may be treated like a new step and may thus start with an indicator (or a call to a reporting method indicating the start) to denote the beginning of a test step. Similarly, each step definition method may also end with an indicator (or a call to a reporting method indicating the end). Report statements for various operations performed by the custom step may be reported by calling a reporter method.

In step 345, the computing device may write one or more feature files. Creating a test script for the code testing tool may include creating a feature file containing the test scenarios and defining the steps to be executed for each of these scenarios. A language, such as Gherkin, may be used to define the contents of a feature file. The steps defined for a feature file may follow a set of predefined step formats, but custom step definitions may also be created as previously described.

Steps for scenarios inside a feature file may be defined in one of the predefined set of step formats. The below section specifies each of the step formats that can be used and the ways in which a step can be created from a step format. In some aspects, some sections of the step may be required, and the step may be used as-is. Some sections of the step may be optional, and may be used to improve the understandability of the statement. Optional sections might be skipped or changed by the computing device without altering the meaning of the steps. Some sections of the step may be restricted. Restricted sections of the step might accept one of the predefined set of values or a random data value, and the available options may be indicated in the description of the instruction. Each step may be followed by the step description and the possible ways the step may be modified with additional options. Exemplary operations include, but are not limited to, browser operations, login operations, click/submit operations, fill/enter operations, verify operations, page operations, group operations, table operations, and the like.

Browser Operations

When I Start the [cpo] Application
This step invokes a new instance of the browser and navigates it to the URL of the given application
Application name can be specified in the square brackets after the "start" keyword.
Given that the [CPTools] application is started.
This step invokes a new instance of the browser and navigates it to the URL of the given application
Application name can be specified in the square brackets before the "started" keyword.
Then Close application
This step closes the browser that was invoked last and may be used as-is.

Login Operations

When I try to [Login] to [CPO]
This step allows performing the Login group operation.
This step has the effect of invoking a browser and navigating to the given application's
URL, followed by the actual steps of the login group operation.
"[CPO]" in square braces is the name of the application which is to be invoked and logged into.
"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"
This operation is just an extension of the generic group operations, any one of which can also be used instead of the Login operation. This step has the side-effect of invoking the browses before performing the operation and hence helps in reducing the number of steps in the scenario.
When I try to [Login] to [CPO] with userid as "user", company as "comp" and password as "pass"
This step allows performing the Login group operation.
This step has the effect of invoking a browser and navigating to the given application's URL, followed by the actual steps of the login group operation.
"[CPO]" in square braces is the name of the application which is to be invoked and logged into.
"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"
This operation is just an extension of the generic group operations, any one of which can also be used instead of the Login operation. This step has the side-effect of invoking the browses before performing the operation and hence helps in reducing the number of steps in the scenario.
"userid", "company" and "password" are the names of the fields which the Login group operation may be using as variables containing the data it uses.
"user", "comp" and "pass" with quotes are the data sent to the "login" group operation.
Any combination of fields and values separated by "," or "and" can be appended.
When I try to [Login] to [CPO] with [ValidCredentials]
This step allows performing the Login group operation.
This step has the effect of invoking a browser and navigating to the given application's URL, followed by the actual steps of the login group operation.
"[CPO]" in square braces is the name of the application which is to be invoked and logged into.
"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"
This operation is just an extension of the generic group operations, any one of which can also be used instead of the Login operation. This step has the side-effect of invoking the browses before performing the operation and hence helps in reducing the number of steps in the scenario.
"[ValidCredentials]" in square braces is the name of the data label containing the data that may be used by the login operation. The framework may look for one of the loaded data sheets, of the group action from action catalog, containing a label field with some part of its value matching "ValidCredentials".
When I try to [Login] to [CPO] with
|userid|company|password|
|user|comp|pass|
This step allows performing the Login group operation.
This step has the effect of invoking a browser and navigating to the given application's URL, followed by the actual steps of the login group operation.
"[CPO]" in square braces is the name of the application which is to be invoked and logged into.
"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"
This operation is just an extension of the generic group operations, any one of which can also be used instead of the Login operation. This step has the side-effect of invoking the browses before performing the operation and hence helps in reducing the number of steps in the scenario.
userid, company and password are the names of the fields for which the "login" operations uses data.
"user", "comp" and "pass" are the data sent to the "login" operation.
When I try to [Login]
This step allows performing the Login group operation.
"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"

This operation is just an extension of the generic group operations, any one of which can also be used instead of the Login operation.

This operation does not invoke a new browser.

When I try to [Login] with userid as "user", company as "comp" and password as "pass"

This step allows performing the Login group operation.

"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"

This operation is just an extension of the generic group operations, any one of which can also be used instead of the Login operation.

This operation does not invoke a new browser.

"userid", "company" and "password" are the names of the fields which the Login group operation may be using as variables containing the data it uses.

"user", "comp" and "pass" with quotes are the data sent to the "login" group operation.

Any combination of fields and values separated by "," or "and" can be appended.

When I try to [Login] to [CPO] with [ValidCredentials]

This step allows performing the Login group operation.

"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"

This operation is just an extension of the generic group operations, any one of which can also be used instead of the Login operation.

This operation does not invoke a new browser.

"[ValidCredentials]" in square braces is the name of the data label containing the data that may be used by the login operation. The framework may look for one of the loaded data sheets, of the group action from action catalog, containing a label field with some part of its value matching "ValidCredentials".

When I try to [Login] to [CPO] with
|userid|company|password|
|user|comp|pass|

This step allows performing the Login group operation.

"[Login]" in square braces is the name of the Login group operation which may already be defined in a group sheet. Any group operation name can be used here as long as it starts with "Login". For example, you can create 2 login group operations with names "LoginCorrectly" and "LoginIncorrectly" and use any of them in the step which is defined here, because both the Login group operation names begin with "Login"

This operation is just an extension of the generic group operations, any one of which can also be used instead of the Login operation.

This operation does not invoke a new browser.

userid, company and password are the names of the fields for which the "login" operations uses data.

"user", "comp" and "pass" are the data sent to the "login" operation.

Click/Submit Operations

When I try to clicks on the login control

This step allows clicking on a control which is already defined in one of the UIMaps of the current page.

"login" is the name of the control to click, this name may be defined in one of the UIMaps of the current page.

When user submits [login information]

This step allows performing the UIMap.Act operation on a data label already defined in a data sheet of the current page.

"[login information]" with square braces specify that this is an data label defined in a data sheet. The framework may look for one of the data sheets of the current page containing a label field with some part of its value matching "LoginInformation" and then call UIMap.Act on the found data sheet and data label.

Fill/Enter Operations

When user enters "USERNAME1" on the username control

This step allows entering some value on a control which is already defined in one of the UIMaps of the current page.

"USERNAME1" with quotes is the value that is to be entered in the given field

"username" is the name of the control on which to enter, this name may be defined in one of the UIMaps of the current page.

"enters" can be replaced by one of the following values: fills|selects|set|input|inserts When I try to enter [valid credentials]

This step allows performing the UIMap.Fill operation on a data label defined in an already loaded data sheet.

[valid credentials] with square braces specify that the data to enter is coming from a data sheet. The framework may look for one of the loaded data sheets containing a label field with some part of its value matching "ValidCredentials" and then call UIMap.Fill on the found data sheet and data label.

"enter" can be replaced by one of the following values: fills|selects|set|input|inserts When I try to enter data in below controls
When I try to fill below controls
|Name|FIRSTNAME LASTNAME|
|UserID|USERID1|

The above 2 steps allows performing the UIMap.Fill operation on a number of controls at the same time, by allowing to specify the control name and the value to enter in a data table next to the step.

The data table may have only 2 columns. The first column is by default the name of the control and second the value to enter on the control. However, the order can also be changed by explicitly specifying a header row containing the column names "ControlName" for the column containing the name of the control and "Value" for the column containing the value to enter in the control, For example: |ControlName|Value|

"fill" can be replaced by one of the following values: fills|selects|set|input|inserts|enters

Verify Operations

Then the user may verify that the [invalid error message is displayed]

This step allows performing the UIMap.Verify operation on a data label defined in an already loaded data sheet.

[invalid error message is displayed] with square braces specify that this is an operation defined in a data sheet. The framework may look for one of the loaded data sheets containing a label field with some part of its value matching "invalid error message is displayed" and then call UIMap.Verify on the found data sheet and data label.

Then user may verify that error message is displayed

This step allows verification of the state a control which is already defined in one of the UIMaps of the current page.

"error message" is the name of the control which is to be verified, this name may be defined in one of the UIMaps of the current page, as the UIMaps of the current page may be searched for to find this control.

"displayed" can be replaced by one of the following options not displayed|enabled|not enabled|visible|not visible|disabled|not disabled Then I may verify that error message is displayed and contains text "application is unavailable"

This step allows verification of the state a control which is already defined in one of the UIMaps of the current page along with verification of the text displayed in that control.

"error message" is the name of the control which is to be verified, this name may be defined in one of the UIMaps of the current page, as the UIMaps of the current page may be searched for to find this control.

"displayed" can be replaced by one of the following options not displayed|enabled|not enabled|visible|not visible|disabled|not disabled "application is unavailable" with quotes is the text that may be verified in the control, this text can be updated as desired.

"And contains" can be replaced by "with"

If the control is of type "WebList", then the given value may be verified for selection. To verify whether the list box contains a set of values, separate the values by ";".

Then I may verify controls in the add users page
Then user tries to verify below controls
|Name|FIRSTNAME LASTNAME|Displayed|
|UserID|USERID1|Not Displayed|

The above 2 steps supports verification of multiple controls from a single step, by allowing to provide the control name and verification properties from a data table next to the step.

The data table can have data for 3 columns (in order)—first for the name of the control, second for the text to verify on the control and the third to verify the state of the control. This order can also be changed by explicitly adding a header row to the DataTable.

Column names in the header row can have following values—"ControlName" for the column containing the name of the control, "State" for the column containing the state to verify of the control and "Value" for the column containing the text to verify in the control. For example: |ControlName|State|Value|.

Data may be provided for the name of the control, while control text and control state can be skipped, in which case default values are used for them. The default value for the state column is "Displayed", and the default value for the value column is " ".

Rows in the Data Table may have the same number of columns, if you do not want to provide values for a specific column in a specific row, then add a blank field for it. For example: |Name||FIRSTNAME LASTNAME| and |UserID-|Displayed||

"displayed" state can be replaced by one of the following options not displayed|enabled|not enabled|visible|not visible|disabled|not disabled If the value provided for state column is "No Displayed" or "Not Visible" then the text is not verified.

Given that default values of the login page are displayed

"login page" is the name of one of the UIMaps of the current page whose default values may be verified.

Then Verify that default values of the login page are displayed

"login page" is the name of one of the UIMaps of the current page whose default values may be verified

Page Operations

Given that user is on the login page

This step allows setting the precondition of a page being displayed. If the page is already displayed then no action is performed, else steps are performed to take user to this page.

"login" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

Given that user is on the Administration page with
|CompanyToSearch|
|test1237|

This step allows setting the precondition of a page being displayed. If the page is already displayed then no action is performed, else steps are performed to take user to this page.

"Administration" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

This step allows to send additional data that may be used by the group actions which may be performed to take us from the current page to the target page. In the given example, in order to reach the Administration page a group operation is performed which uses data for the field CompanyToSearch which we are passing here.

Given that login page is displayed

This step allows to set precondition of a page being displayed. If the page is already displayed then no action is performed, else steps are performed to take user to this page.

"login" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

Given that Administration page is displayed with

This step allows setting precondition of a page being displayed. If the page is already displayed then no action is performed, else steps are performed to take user to this page.

"Administration" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

This step allows sending additional data that may be used by the group actions which may be performed to take us from the current page to the target page. In the given example, in order to reach the Administration page a group operation is performed which uses data for the field CompanyToSearch which we are passing here.

When user navigates to the checkout page

This step allows setting precondition of a page being displayed. If the page is already displayed then no action is performed, else steps are performed to take user to this page.

"checkout" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

When user navigates to the Administration page with

This step allows setting precondition of a page being displayed. If the page is already displayed then no action is performed, else steps are performed to take user to this page.

"Administration" is the name of one of the pages defined in the page catalog which may be verified or moved to. Verification is done by verifying that any one of the given uimaps of the page may be displayed.

Moving to the page is done by looking at the navigation catalog and finding the sequence of operations used to reach the specified page from the current page.

If there are no actions defined in the navigation catalog which can navigate from the current page to the target page, then we search for a navigation from the DEFAULT page to the target page.

This step allows to send additional data that may be used by the group actions which may be performed to take us from the current page to the target page. In the given example, in order to reach the Administration page a group operation is performed which uses data for the field CompanyToSearch which we are passing here.

Then verify that login page is displayed

This step allows the verification of page being displayed in the application.

"login" is the name of one of the pages defined in the page catalog which may be verified. Verification is done by verifying that any one of the given uimaps of the page may be displayed.

Then verify that login page is NOT displayed

This step allows the verification of page NOT being displayed in the application.

"login" is the name of one of the pages defined in the page catalog which may be verified. Verification is done by verifying that none of the given uimaps of the page may be displayed.

Group Operations

When user performs the [create new user] operation with [invaliddata]

This step allows performing an operation which is already defined in a UIMap group instruction sheet and also allows specifying the data to use to perform the operation. The data that can be specified here with the operation may also be predefined in a data sheet. The group instructions may use variable names instead of direct value for the data fields it accepts.

"[create new user]" with square braces is the name of the group operation to perform.

Group operations may be defined in a group sheet and mentioned in the group action catalog. Before performing a group operation the start page of the group operation is fetched from the group action catalog and the application is navigated to that page, if not already there.

"[invaliddata]" with square braces is the name of the data label containing the data that may be used by the login operation. The framework may look for one of the loaded data sheets containing a label field with some part of its value matching "invaliddata".

"performs" can be replaced by executes.

When user performs the [create new user]

This step allows performing an operation which is already defined in a UIMap group instruction sheet "[create new user]" with square braces is the name of the group operation to perform. Group operations may be defined in a group sheet and mentioned in the group action catalog. Before performing a group operation the start page of the group operation is fetched from the group action catalog and the application is navigated to that page, if not already there.

"performs" can be replaced by executes.

When User performs [create new user] with userid as "user", company as "comp" and password as "pass"

This step allows performing an operation which is already defined in a UIMap group instruction sheet and also allows to specify the data to use to perform the operation. The data that can be directly specified in the step with fields and values. The group instructions may use variable names instead of direct value for the fields it accepts.

"performs" can be replaced by executes.

"[create new user]" with square braces is the name of the group operation to perform. Group operations may be defined in a group sheet and mentioned in the group action catalog. Before performing a group operation the start page of the group operation is fetched from the group action catalog and the application is navigated to that page, if not already there.

userid, company and password are the names of the fields for which the "create new user" operations uses data.

"user", "comp" and "pass" with quotes are the data sent to the "create new user" operation.

Any combination of fields and values separated by "," or "and" can be appended.

When User performs [create new user] with
|userid|company|password|
|user|comp|pass|

This step allows performing an operation which is already defined in a UIMap group instruction sheet and also allows to specify the data to use to perform the operation. The data that can be directly specified in the step in the form of a cucumber data table.

The group instructions may use variable names instead of direct value for the fields it accepts.

"performs" can be replaced by executes.

"[create new user]" with square braces is the name of the group operation to perform.

Group operations may be defined in a group sheet and mentioned in the group action catalog. Before performing a group operation the start page of the group operation is fetched from the group action catalog and the application is navigated to that page, if not already there.

userid, company and password are the names of the fields for which the "create new user" operations uses data.

"user", "comp" and "pass" are the data sent to the "create new user" operation.

Table Operations

When user tries to expand the 1st row in the admin table

This step allows to click on the expand/collapse row icon of the expand/collapse column for the given rows in the given table 1st can be replaced by any numeric number like 2nd, 3rd, $21^{st}$, and the like and ALL to specify that all rows may be expanded. If ALL is not specified, a combination of indexes can also be specified like 1st, 2nd and 3rd. Row indexes start from 1.

"Admin" is the name of one of the UITables defined for the current page in the page catalog.

"expand" can be replaced by "collapse" to collapse instead of expand.

When user tries to expand all rows in the admin table where approver is "APPROVER1" and user is "USER1"

This step allows to click on the expand/collapse row icon of the expand/collapse column in the given table for rows matching the given criteria which is specified in the step.

"ALL" can be replaced by any numeric number like 2nd, 3rd, $21^{st}$, and the like. If ALL is not specified, a combination of indexes can also be specified like 1st, 2nd and 3rd. Row indexes start from 1.

"Admin" is the name of one of the UITables defined for the current page in the page catalog.

"Approver" and "User" are the names of the table columns in which we'll search for matching values, only those rows those match the given values may be selected.

"APPROVER1" and "USER1" with quotes is the set of values looked for in the "Approver" and "User" column to select matching rows.

"expand" can be replaced by "collapse" to collapse instead of expand.

When user tries to expand all rows in the admin table where
|approver|user|
|APPROVER1|USER1|

This step allows to click on the expand/collapse row icon of the expand/collapse column in the given table for rows matching the given criteria which is specified in the form of cucumber data table.

"ALL" can be replaced by any numeric number like 2nd, 3rd, $21^{st}$, and the like. If ALL is not specified, a combination of indexes can also be specified like 1st, 2nd and 3rd. Row indexes start from 1.

"Admin" is the name of one of the UITables defined for the current page in the page catalog.

"Approver" and "User" are the names of the table columns in which we'll search for matching values, only those rows those match the given values may be selected.

"APPROVER1" and "USER1" with quotes is the set of values looked for in the "Approver" and "User" column to select matching rows.

"expand" can be replaced by "collapse" to collapse instead of expand.

When user tries to expand the 1st found rows

This step allows to click on the expand/collapse row icon of the expand/collapse column for the specified rows which were found in the last search table operation.

"expand" can be replaced by "collapse" to collapse instead of expand.

1st can be replaced by any numeric number like 2nd, 3rd, $21^{st}$, and the like and ALL to specify that all rows may be expanded. If ALL is not specified, a combination of indexes can also be specified like 1st, 2nd and 3rd. Row indexes start from 1.

This operation works in continuation to a search operation, where it acts on the results found by the last search operation.

When user tries to select the 1st row in the admin table

This step allows to click on the select row check box of the select/deselect column for the given rows in the given table.

1st can be replaced by any numeric number like 2nd, 3rd, $21^{st}$, and the like and ALL to specify that all rows may be selected. If ALL is not specified, a combination of indexes can also be specified like 1st, 2nd and 3rd. Row indexes start from 1.

"Admin" is the name of one of the UITables defined for the current page in the page catalog.

"select" can be replaced by "deselect" to deselect instead of select.

When user tries to select all rows in the admin table where approver is "APPROVER1" and user is "USER1"

This step allows to click on the select row check box of the select/deselect column in the given table for the rows matching the criteria specified in the step.

ALL can be replaced by any numeric number like 2nd, 3rd, $21^{st}$, and the like. If ALL is not specified, a combination of indexes can also be specified like 1st, 2nd and 3rd. Row indexes start from 1.

"Admin" is the name of one of the UITables defined for the current page in the page catalog.

"Approver" and "User" are the names of the table columns in which we'll search for matching values, only those rows those match the given values may be selected.

"APPROVER1" and "USER1" with quotes is the set of values looked for in the "Approver" and "User" column to select matching rows.

"select" can be replaced by "deselect" to deselect instead of select.

When user tries to select all rows in the admin table where
|approver|user|
|APPROVER1|USER1|

This step allows to click on the select row check box of the select/deselect column in the given table for the rows matching the criteria specified in the cucumber data table.

ALL can be replaced by any numeric number like 2nd, 3rd, 21$^{st}$, and the like. If ALL is not specified, a combination of indexes can also be specified like 1st, 2nd and 3rd. Row indexes start from 1.

"Admin" is the name of one of the UITables defined for the current page in the page catalog.

"Approver" and "User" are the names of the table columns in which we'll search for matching values, only those rows those match the given values may be selected.

"APPROVER1" and "USER1" with quotes is the set of values looked for in the "Approver" and "User" column to select matching rows.

"select" can be replaced by "deselect" to deselect instead of select.

When user tries to select the 1st found rows

This step allows to click on the select row check box of the select/deselect column in the specified rows which were found in the last search table operation.

"select" can be replaced by "deselect" to deselect instead of select.

1st can be replaced by any numeric number like 2nd, 3rd, 21$^{st}$, and the like and ALL to specify that all rows may be selected. If ALL is not specified, a combination of indexes can also be specified like 1st, 2nd and 3rd. Row indexes start from 1.

This operation works in continuation to a search operation, where it acts on the results found by the search operation.

When I try to Filter rows in the Admin table where approver is "APPROVER1" and user is "USER1"

"Admin" is the name of one of the UITables defined for the current page in the page catalog.

"Approver" and "User" are the names of the table columns in which we'll apply the given filter values.

"APPROVER1" and "USER1" with quotes is the set of values used for applying filter in the "Approver" and "User" column.

When I try to Filter rows in the Admin table where |approver|user| |APPROVER1|USER1|

"Admin" is the name of one of the UITables defined for the current page in the page catalog.

"Approver" and "User" are the names of the table columns in which we'll apply the given filter values.

"APPROVER1" and "USER1" with quotes is the set of values used for applying filter in the "Approver" and "User" column.

When I try to Clear Filters in the Admin table

"Admin" is the name of one of the UITables defined for the current page in the page catalog.

When I sort the UserID column of the users table in ascending order

"users" is the name of one of the UITables defined for the current page in the page catalog.

"UserID" is the name of the column which is to be sorted. This column may be defined in the users UITable. Multiple column names can also be specified separated by "," or "and".

"ascending" is the order in which the sort may happen. Can also be "descending"

Then the UserID column of the users table may be in ascending order

"users" is the name of one of the UITables defined for the current page in the page catalog.

"UserID" is the name of the column which is to be verified for sort. This column may be defined in the users UITable. Multiple column names can also be specified separated by "," or "and".

"ascending" is the order in which the sort may be verified. Can also be "descending"

When I find rows in the users table where approver is "APPROVER1" and user is "USER1"

"users" is the name of one of the UITables defined for the current page in the page catalog.

"approver" and "user" are the name of the columns which are to be searched for.

"APPROVER1" and "USER1" with quotes is the set of values that may be searched in the given columns.

This operation can be combined with other operations that depend on some rows that were searched in the last operation.

"find" can be replaced by "search"

When I try to click on the options column of the 2nd found row

This operation can be called only after a successful search operation.

"options" is the name of the column which is to be clicked in the given row

"2nd" is the row which is to be clicked. This is the searched row index from the last search operation and not the actual row index of the table.

When I try to click on the options column of the 2nd row in the users table

"users" is the name of one of the UITables defined for the current page in the page catalog.

"options" is the name of the column which is to be clicked in the given row

"2nd" is the row which is to be clicked

When I try to click on the options column of the 2nd row in the users table where approver is "APPROVER1" and user is "USER1"

"users" is the name of one of the UITables defined for the current page in the page catalog.

"options" is the name of the column which is to be clicked in the given row

"2nd" is the row which is to be clicked after the search operation has found matching rows.

"approver" and "user" are the name of the columns which are to be searched for.

"APPROVER1" and "USER1" with quotes is the set of values that may be searched in the given columns.

When I try to click on the options column of the 2nd row in the users table where |approver|user||APPROVER1|USER1|

"users" is the name of one of the UITables defined for the current page in the page catalog.

"options" is the name of the column which is to be clicked in the given row

"2nd" is the row which is to be clicked after the search operation has found matching rows.

"approver" and "user" are the name of the columns which are to be searched for.

"APPROVER1" and "USER1" with quotes is the set of values that may be searched in the given columns.

When I enter "USER1" in the UserID column of the 2nd, 3rd and 5th found rows

This operation can be called only after a successful search operation

"UserID" is the name of the column for which the value may be entered.

"USER1" with quotes is the value that may be entered.

"2nd, 3rd and 5th" are the rows after search for which the operation may be performed. "All" can be used to specify all the searched rows. This value can be completely omitted to specify all the found rows.

When I try to enter "USER1" on the UserID column of the 2nd row in the users table "users" is the name of one of the UITables defined for the current page in the page catalog.

"UserID" is the name of the column for which the value may be entered

"2nd" is the row which is to be clicked

"2nd" is the row for which the operation may be performed. "All" can be used to specify all the rows.

When I try to enter "USER2" on the UserID column of the 2nd row in the users table where approver is "APPROVER1" and user is "USER1"

"users" is the name of one of the UITables defined for the current page in the page catalog.

"UserID" is the name of the column for which the value may be entered

"2nd" is the searched row for which the operation may be performed. "All" can be used to specify all the rows.

"approver" and "user" are the name of the columns which are to be searched for.

"APPROVER1" and "USER1" with quotes is the set of values that may be searched in the given columns.

When I try to enter "USER2" on the UserID column of the 2nd row in the users table where |approver|user||APPROVER1|USER1|

"users" is the name of one of the UITables defined for the current page in the page catalog.

"UserID" is the name of the column for which the value may be entered

"2nd" is the searched row for which the operation may be performed. "All" can be used to specify all the rows.

"approver" and "user" are the name of the columns which are to be searched for.

"APPROVER1" and "USER1" with quotes is the set of values that may be searched in the given columns.

Then I may verify that UserID column contains text "USER2" in the 2nd, 3rd and 5th found rows This operation can be called only after a successful search operation "UserID" is the name of the column for which the value may be verified.

"USER2" with quotes is the value that may be verified.

"2nd, 3rd and 5th" are the rows after search for which the operation may be performed.

"All" can be used to specify all the searched rows. This value can be completely omitted to specify all the found rows.

"contains" can be replaced by "has"

Then I may verify that UserID column contains text "USER2" in the 2nd, 3rd and 5th rows of the Users table "UserID" is the name of the column for which the value may be verified.

"USER2" with quotes is the value that may be verified.

"2nd, 3rd and 5th" are the rows for which the operation may be performed. "All" can be used to specify all the rows. This value can be completely omitted to specify all the rows.

"contains" can be replaced by "has"

Then I may verify that UserID column contains text "USER2" in the 2nd, 3rd and 5th rows of the Users table where approver is "APPROVER1" and user is "USER1"

"UserID" is the name of the column for which the value may be verified.

"USER2" with quotes is the value that may be verified.

"2nd, 3rd and 5th" are the rows for which the operation may be performed. "All" can be used to specify all the rows. This value can be completely omitted to specify all the rows.

"contains" can be replaced by "has"

"approver" and "user" are the name of the columns which are to be searched for.

"APPROVER1" and "USER1" with quotes is the set of values that may be searched in the given columns.

Writing a step for a custom step definition may be similar to writing a step using the pre-defined step formats explained above. One difference, however, is that the format of the step for a custom step definition may depend on the format supported by the custom step definition itself. The code testing tool may keep track of the current page on which the operation is being performed and also the page on which the user lands after performing a certain operation, for one or more (e.g., all) steps which were defined using the pre-defined step formats. When custom steps are used, keeping track of the current page might be difficult for the code testing tool. According, after each call to a custom step definition from the feature file, a call may be made to any of the page step definitions steps, specifying the page on which the computing device is currently on after the custom step has performed its operations.

In step 350, the computing device may store the generated feature file(s) in one or more data storage locations. The framework may specify a set of predefined locations in the application project which may be used to store test resources. For storing feature files created for the code testing tool, the location to use may be recommended to be a particular application project package folder. Inside this folder, any number of sub-folders may be created to categorize the feature files.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
receiving, at an application code testing computing device, a set of instructions for testing one or more user interface pages of an application under test;
determining a type of format for the set of instructions from a plurality of formats;
determining, by the application code testing computing device, that the set of instructions is written in a first format and a first style, wherein the first format is one of the plurality of formats, has a codeless format, and supports a plurality of styles and wherein the first style is one of the plurality of styles; and
processing the set of instructions in accordance with the determined type of format and the determined style, the processing comprising:
in response to determining that the set of instructions is written in the first format and the first style, parsing the set of instructions to determine an action to perform and to determine data to use for the action to perform;
converting the determined action to perform to a second format to generate a converted action to perform and converting the determined data to use for the action to perform to the second format to generate converted data; and
sending, by the application code testing computing device to an application framework, the converted action to perform and the converted data.

2. The method of claim 1, wherein parsing the set of instructions to determine the action to perform comprises:
determining, in the set of instructions, a location of a trigger indicating the action to perform; and
based on the location of the trigger indicating the action to perform, determining that text in the set of instructions following the trigger comprises a name of the action to perform.

3. The method of claim 1, wherein parsing the set of instructions to determine the data to use for the action to perform comprises:
determining, in the set of instructions, a location of a trigger indicating the data to use for the action to perform; and
based on the location of the trigger indicating the data to use for the action to perform, determining that text in the set of instructions following the trigger comprises a name or a location of a data sheet storing the data to use for the action to perform.

4. The method of claim 1, wherein the application code testing computing device is configured to run an application code testing plug-in.

5. The method of claim 1, wherein the first format comprises an imperative scenario written in Gherkin format or a declarative scenario written in Gherkin format.

6. The method of claim 1, further comprising:
determining a target interface page of the one or more user interface pages to test;
determining a current interface page of the one or more user interface pages; and
responsive to a determination that the current interface page is not the target interface page, accessing navigation data from a navigation catalog, wherein the navigation data is usable to transition the application under test from the current interface page to the target interface page.

7. The method of claim 6, further comprising:
using the navigation data to transition the application under test from the current interface page to the target interface page; and
storing an indication of the target interface page as a current location of the application under test.

8. An application code testing computing device, comprising:
a processor; and
memory storing computer-executable instructions that, when executed by the processor, cause the application code testing computing device to:
receive a set of instructions for testing one or more user interface pages of an application under test;
determine a type of format for the set of instructions from a plurality of formats;
determine that the set of instructions is written in a first format and a first style, wherein the first format is one of the plurality of formats, has a codeless format, and supports a plurality of styles and wherein the first style is one of the plurality of styles; and
process the set of instructions in accordance with the determined type of format and the determined style, the processing comprising:
in response to determining that the set of instructions is written in the first format and the first style, parse the set of instructions to determine an action to perform and to determine data to use for the action to perform;
convert the determined action to perform to a second format to generate a converted action to perform and convert the determined data to use for the action to perform to the second format to generate converted data; and
send, to an application framework, the converted action to perform and the converted data.

9. The application code testing computing device of claim 8, wherein parsing the set of instructions to determine the action to perform comprises:
determining, in the set of instructions, a location of a trigger indicating the action to perform; and
based on the location of the trigger indicating the action to perform, determining that text in the set of instructions following the trigger comprises a name of the action to perform.

10. The application code testing computing device of claim 8, wherein parsing the set of instructions to determine the data to use for the action to perform comprises:
determining, in the set of instructions, a location of a trigger indicating the data to use for the action to perform; and
based on the location of the trigger indicating the data to use for the action to perform, determining that text in the set of instructions following the trigger comprises a name or a location of a data sheet storing the data to use for the action to perform.

11. The application code testing computing device of claim 8, wherein the application code testing computing device is configured to run an application code testing plug-in.

12. The application code testing computing device of claim 8, wherein the first format comprises an imperative scenario written in Gherkin format or a declarative scenario written in Gherkin format.

13. The application code testing computing device of claim 8, wherein the memory stores computer-executable instructions that, when executed by the processor, cause the application code testing computing device to:

determine a target interface page of the one or more user interface pages to test;

determine a current interface page of the one or more user interface pages; and responsive to a determination that the current interface page is not the target interface page, access navigation data from a navigation catalog, wherein the navigation data is usable to transition the application under test from the current interface page to the target interface page.

14. The application code testing computing device of claim 13, wherein the memory stores computer-executable instructions that, when executed by the processor, cause the application code testing computing device to:

use the navigation data to transition the application under test from the current interface page to the target interface page; and store an indication of the target interface page as a current location of the application under test.

15. One or more non-transitory computer-readable media storing computer-readable instructions that, when executed by an application code testing computing device, cause the application code testing computing device to:

receive a set of instructions for testing one or more user interface pages of an application under test;

determine a type of format for the set of instructions from a plurality of formats;

determine that the set of instructions is written in a first format and a first style, wherein the first format is one of the plurality of formats, has a codeless format, and supports a plurality of styles and wherein the first style is one of the plurality of styles; and process the set of instructions in accordance with the determined type of format and the determined style, the processing comprising:

in response to determining that the set of instructions is written in the first format, parse the set of instructions to determine an action to perform and to determine data to use for the action to perform;

convert the determined action to perform to a second format to generate a converted action to perform and convert the determined data to use for the action to perform to the second format to generate converted data; and send, to an application framework, the converted action to perform and the converted data.

16. The one or more non-transitory computer-readable media of claim 15, wherein parsing the set of instructions to determine the action to perform comprises:

determining, in the set of instructions, a location of a trigger indicating the action to perform; and based on the location of the trigger indicating the action to perform, determining that text in the set of instructions following the trigger comprises a name of the action to perform.

17. The one or more non-transitory computer-readable media of claim 15, wherein parsing the set of instructions to determine the data to use for the action to perform comprises:

determining, in the set of instructions, a location of a trigger indicating the data to use for the action to perform; and based on the location of the trigger indicating the data to use for the action to perform, determining that text in the set of instructions following the trigger comprises a name or a location of a data sheet storing the data to use for the action to perform.

18. The one or more non-transitory computer-readable media of claim 15, wherein the application code testing computing device is configured to run an application code testing plug-in.

19. The one or more non-transitory computer-readable media of claim 15, storing computer-readable instructions that, when executed by the application code testing computing device, cause the application code testing computing device to:

determine a target interface page of the one or more user interface pages to test;

determine a current interface page of the one or more user interface pages; and responsive to a determination that the current interface page is not the target interface page, access navigation data from a navigation catalog, wherein the navigation data is usable to transition the application under test from the current interface page to the target interface page.

20. The one or more non-transitory computer-readable media of claim 19, storing computer-readable instructions that, when executed by the application code testing computing device, cause the application code testing computing device to:

use the navigation data to transition the application under test from the current interface page to the target interface page; and store an indication of the target interface page as a current location of the application under test.

* * * * *